United States Patent [19]
Yano

[11] Patent Number: 6,064,530
[45] Date of Patent: May 16, 2000

[54] EYEPIECE SYSTEM WITH POSITIVE MENISCUS LENS ON OBJECT SIDE

[75] Inventor: Takaaki Yano, Hokkaido, Japan

[73] Assignee: Asahi Kogaku Kogyo Kabushiki Kaisha, Tokyo, Japan

[21] Appl. No.: 09/003,813

[22] Filed: Jan. 7, 1998

[30] Foreign Application Priority Data

Jan. 10, 1997 [JP] Japan ..................................... 9-002681

[51] Int. Cl.[7] ................................................. G02B 25/00
[52] U.S. Cl. ............................................ 359/645; 359/643
[58] Field of Search .................................... 395/645, 643, 395/649, 646, 647

[56] References Cited

U.S. PATENT DOCUMENTS

| | | | |
|---|---|---|---|
| 5,546,237 | 8/1996 | Fukumoto | 359/794 |
| 5,790,313 | 8/1998 | Kanai | 359/645 |
| 5,812,324 | 9/1998 | Fukumoto | 359/643 |
| 5,815,317 | 9/1998 | Omura | 359/645 |

FOREIGN PATENT DOCUMENTS 62-255914  11/1987  Japan .

*Primary Examiner*—Georgia Epps
*Assistant Examiner*—Michael A Lucas
*Attorney, Agent, or Firm*—Greenblum & Bernstein P.L.C.

[57] ABSTRACT

An eyepiece system includes a first meniscus lens of positive power having a convex surface located on the object side and a cemented lens element composing of a second and a third lens element of positive power. The eyepiece system satisfies the conditions: (1) $0.2 < f_e/f_1 < 0.65$ and (2) $0.6 < f_e/f_{23} < 1.0$, wherein $f_1$ represents the focal length of the first lens element, $f_e$ represents the focal length of the entire system, and $f_{23}$ represents the resultant focal length of the second and third lens elements.

4 Claims, 8 Drawing Sheets

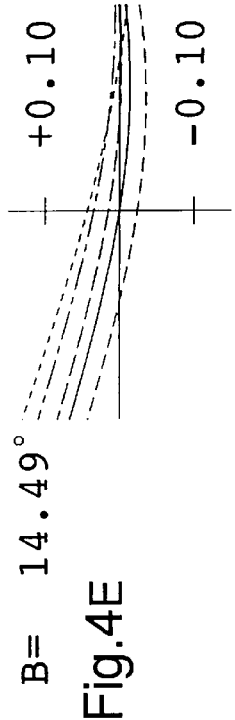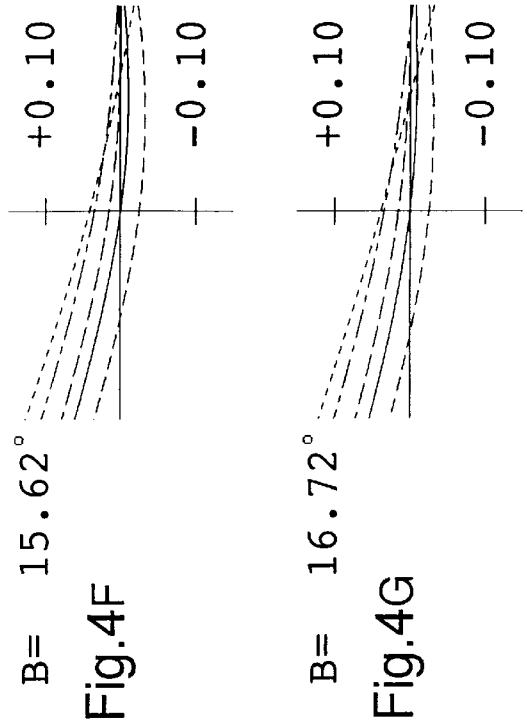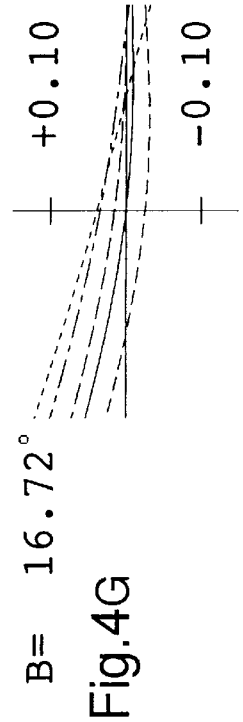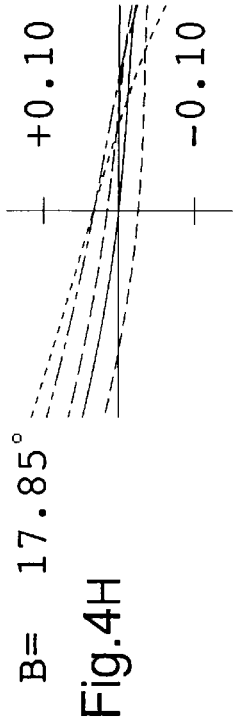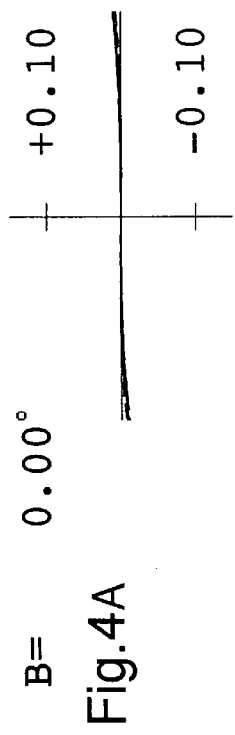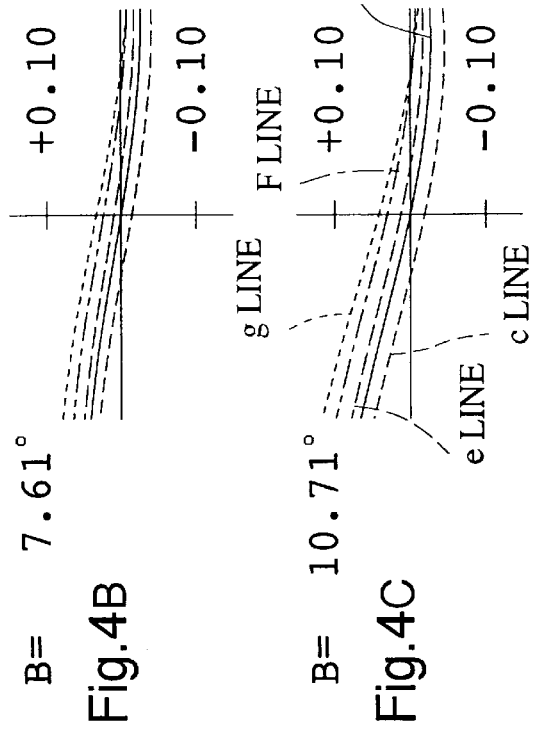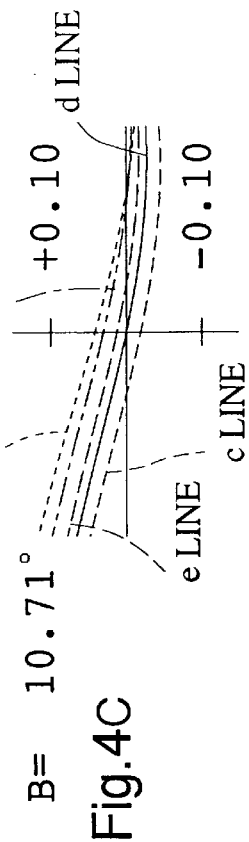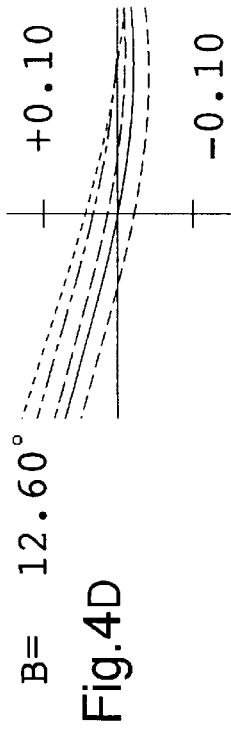

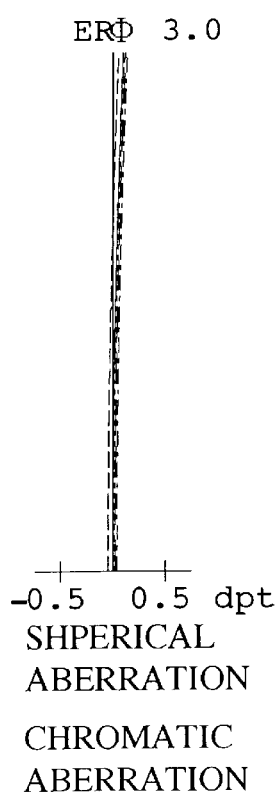
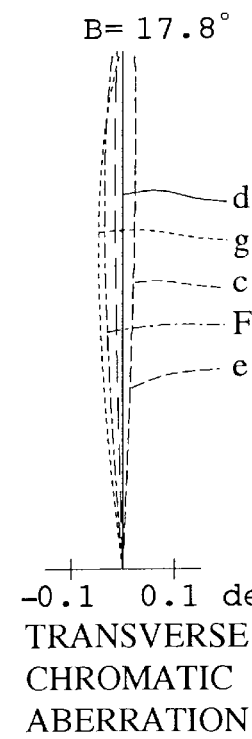
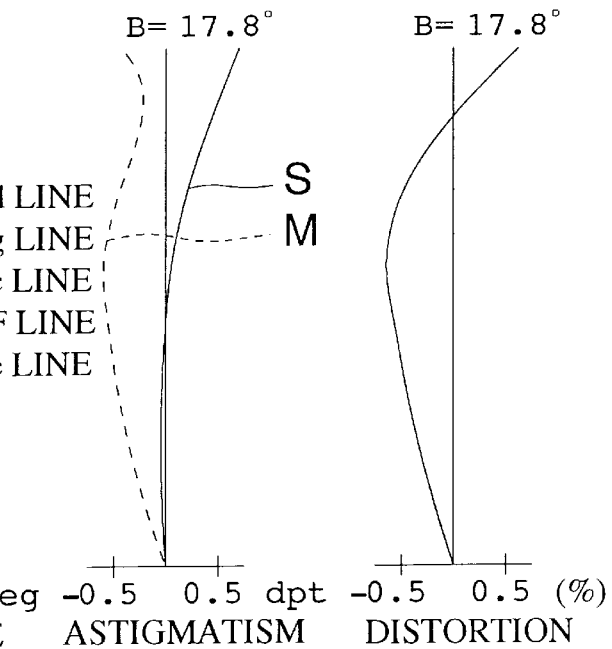

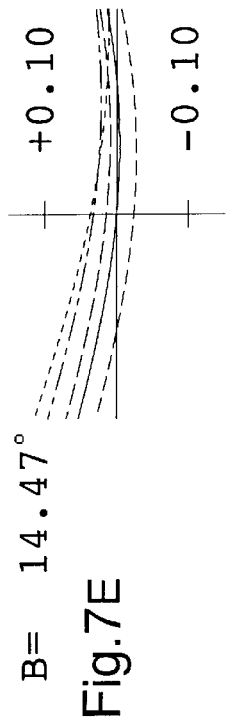
Fig.7E B= 14.47°
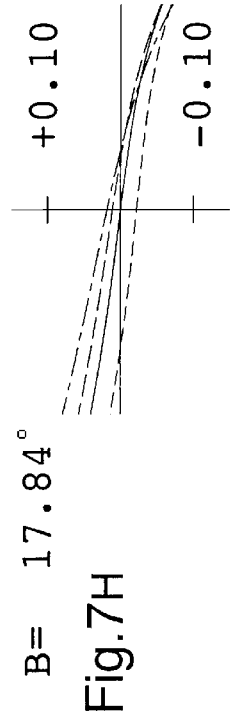
Fig.7F B= 15.60°
Fig.7G B= 16.71°
Fig.7H B= 17.84°
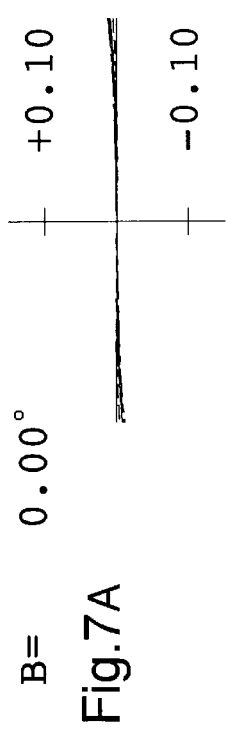
Fig.7A B= 0.00°
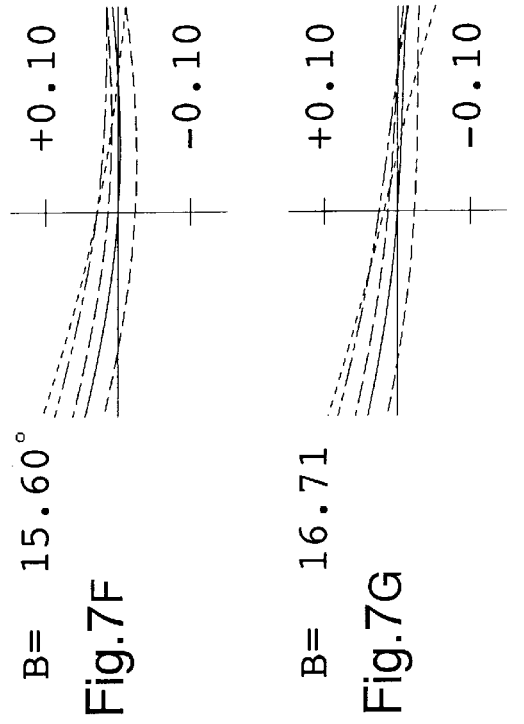
Fig.7B B= 7.59°
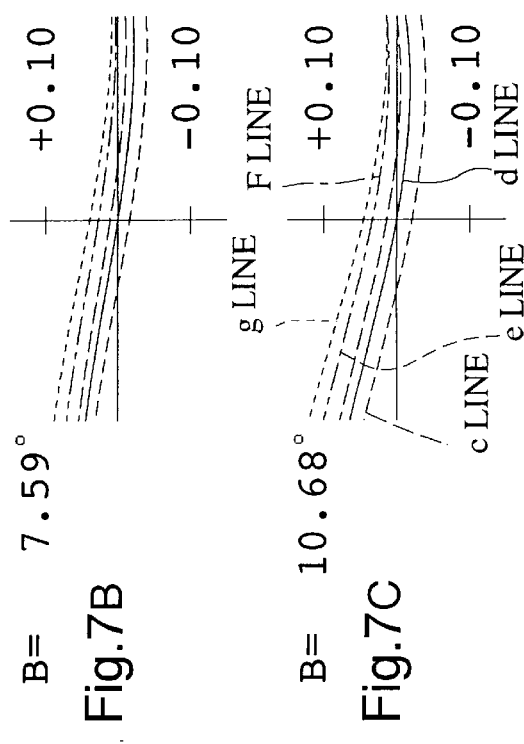
Fig.7C B= 10.68°
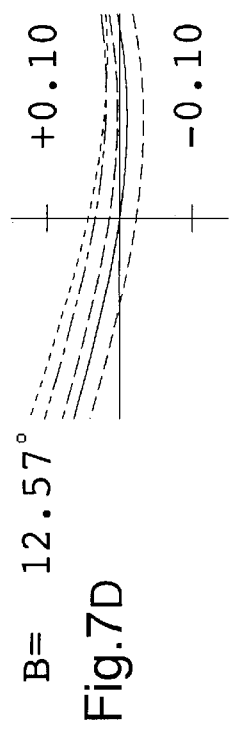
Fig.7D B= 12.57°

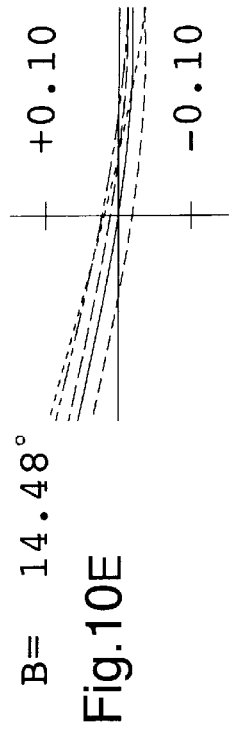
Fig.10A  B= 0.00°
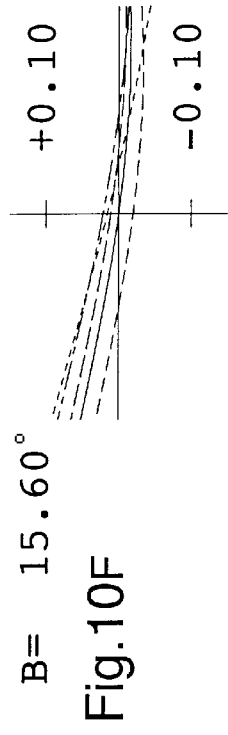
Fig.10B  B= 7.61°
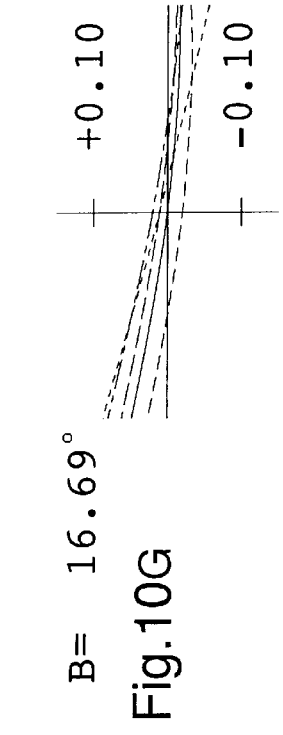
Fig.10C  B= 10.71°
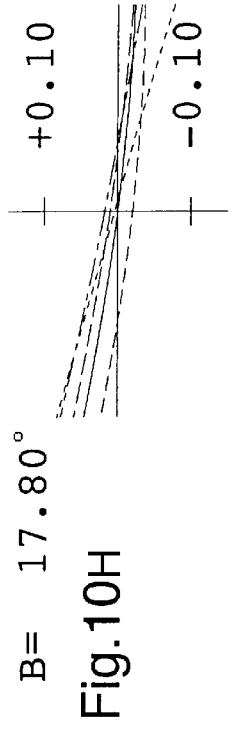
Fig.10D  B= 12.60°
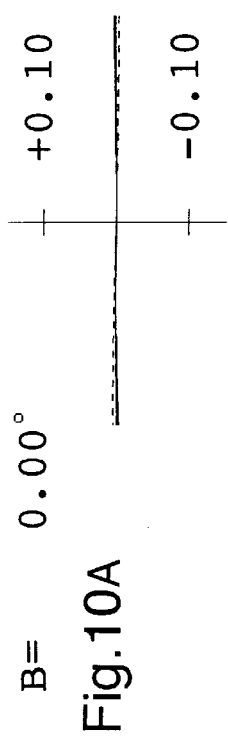
Fig.10E  B= 14.48°
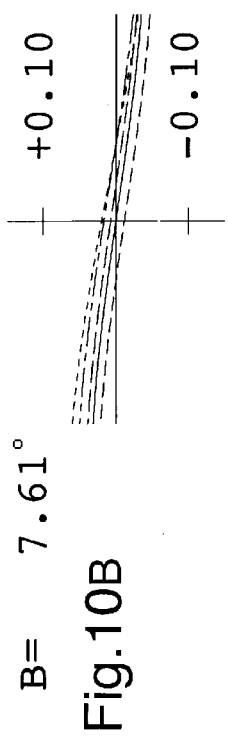
Fig.10F  B= 15.60°
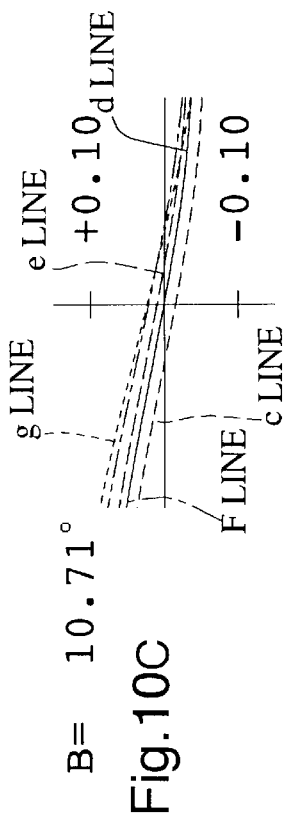
Fig.10G  B= 16.69°
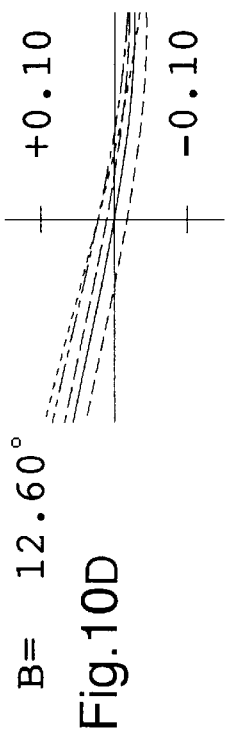
Fig.10H  B= 17.80°

EYEPIECE SYSTEM WITH POSITIVE MENISCUS LENS ON OBJECT SIDE

BACKGROUND OF THE INVENTION

1. Field of the Invention

The present invention relates to an eyepiece system used for, for example, a single lens reflex camera.

2. Description of the Related Art

In a view finder of a single lens reflex camera, a real image formed by a photographing optical system (objective optical system) is viewed through an eyepiece system. A view finder which includes a relay lens system arranged between the objective lens system and the eyepiece system, in which a relay image formed by the relay lens system is viewed through the eyepiece system, is also known.

In such eyepiece systems, an internal indication member is provided within the view finder in the vicinity of the image forming plane of an image forming system (or the relay lens system). To prevent foreign matter on the internal indication member from obstructing the view, it is preferable that the distance $f_b$ between the image forming plane and the first lens element of the eyepiece system be increased. However, if the distance $f_b$ increases, the focal length $f_e$ of the entire optical system increases and hence, the size of the entire optical system also increases. In addition, the magnification of the view finder tends to decrease.

SUMMARY OF THE INVENTION

It is an object of the present invention to provide a compact eyepiece system whose length is within approximately 1.5 times the focal length and in which the distance $f_b$ between the image forming surface and the first lens element of the eyepiece system can be increased and is approximately 0.5 to 0.6 times the focal length.

To achieve the above-mentioned object, according to the present invention, there is provided an eyepiece system comprising a first, a second and a third lens element arranged in this order from the object side. The first lens element is composed of a meniscus lens of positive power having a convex surface located on the object side. The second and third lens elements are cemented together to form a cemented lens group of positive power, wherein said eyepiece system satisfies the following conditions (1) and (2):

$$0.2 < f_e/f_1 < 0.65 \quad (1)$$

and $$0.6 < f_e/f_{23} < 1.0; \quad (2)$$

wherein $f_1$ is the focal length of the first lens element, $f_e$ is the focal length of the entire system;

$f_{23}$ is the resultant focal length of the second and third lens elements (the cemented lens group).

Preferably, the eyepiece system satisfies the following further condition (3):

$$(L_D + f_b)/f_e < 1.6; \quad (3)$$

Wherein:

$L_D$ is the distance between the first surface of the first lens element and the last surface of the third lens element;

$f_b$ is the distance between the image forming surface to be viewed through the eyepiece system and the first surface of the first lens element.

The present disclosure relates to subject matter contained in Japanese Patent Application No. 9-2681 (filed on Jan. 10, 1997) which is expressly incorporated herein by reference in its entirety.

BRIEF DESCRIPTION OF THE DRAWINGS

The invention will be described below in detail with reference to the accompanying drawings, in which:

FIGS. 4A, 4B, 4C, 4D, 4E, 4F, 4G and 4H show transverse aberration diagrams of the lens system shown in FIG. 2;

FIGS. 6A, 6B, 6C, and 6D show aberration diagrams of the lens system shown in FIG. 5;

FIGS. 7A, 7B, 7C, 7D, 7E, 7F, 7G and 7H show transverse aberration diagrams of the lens system shown in FIG. 5;

FIGS. 10A, 10B, 10C, 10D, 10E, 10F, 10G and 10H show transverse aberration diagrams of a lens system shown in FIG. 8.

DESCRIPTION OF THE PREFERRED EMBODIMENT

Figure 1:
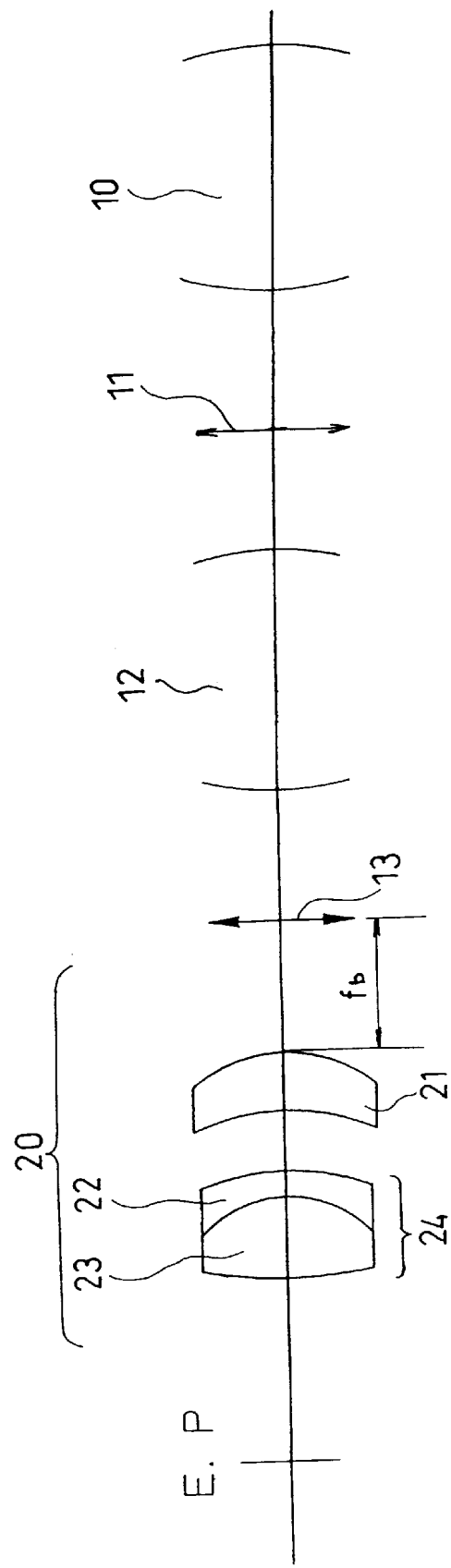
FIG. 1 is a schematic view of an optical system having an eyepiece system according to the present invention.

In the illustrated embodiment, as can be seen in FIG. 1, an image formed on the primary image forming plane 11 by a photographing lens system 10 is formed again on a secondary image forming plane 13 by a relay lens system 12, so that the image formed on the secondary image forming plane 13 can be viewed through an eyepiece system 20. EP represents the eye point.

The eyepiece system 20 is comprised of a first lens element 21, a second lens element 22 and a third lens element 23, in this order from the object side (secondary image forming plane 13). The first lens element 21 is made of a meniscus lens of positive power having a convex surface on the object side. The second and third lens elements 22 and 23 are cemented to each other thereby forming a cemented lens group 24 having positive power. The cemented lens group 24 is composed of a negative meniscus lens element 22 and a biconvex lens element 23.

Each of the first lens element 21 and the cemented lens group 24 is given positive power so that the power is balanced as defined in conditions (1) and (2). If the conditions (1) and (2) are satisfied, not only can the length of the entire system be reduced but also aberrations can be effectively corrected. If the first lens element 21 is a negative lens, it is necessary to increase the power of the cemented lens group 24. If the positive power of the cemented lens group 24 is large, the size (length) of the entire system can be reduced. However, aberrations, particularly coma, cannot be effectively corrected.

The first lens element 21 of positive power is made of a positive meniscus lens having a convex surface located on the object side. Accordingly, the principal point thereof is moved toward the object-side, and hence the distance $f_b$ can be increased in comparison with other shapes, such as a biconvex lens or a meniscus lens having a convex surface on the eye point side. Moreover, since the first lens element 21 is shaped so that the peripheral portion thereof is away from the object side (secondary image forming plane 13), a large space for accommodating the internal indication member of the finder can be provided.

If the positive power of the first lens element 21 is below the lower limit in condition (1), it is necessary to increase the positive power of the cemented lens group 24. Consequently, aberrations (particularly coma) cannot be effectively corrected. Conversely, if the positive power of the first lens element 21 is above the upper limit in the condition (1), it is difficult for the lens 21 made of a single lens to correct the aberrations.

If the positive power of the cemented lens group 24 is below the lower limit in condition (2), it is necessary to increase the positive power of the first lens element 21. Consequently, aberrations (particularly coma) cannot be effectively corrected by the first lens element 21. Conversely, if the positive power of the cemented lens group 24 is above the upper limit in condition (2), the length of the entire optical system can be reduced but the aberrations (particularly coma) cannot be effectively corrected.

Condition (3) specifies the conditions necessary to balance the size of the eyepiece of the view finder, the size of the internal indication within the finder, and the size of the apparent visual angle. The size y of the internal indication within the finder is given by:

$$y = f_e \cdot \tan \beta$$

wherein $\beta$ represents the apparent visual angle.

If condition (3) is not satisfied, the size of the view finder is increased.

Numerical examples (Embodiments 1 through 3) of the optical system of the present invention will be discussed below with reference to the following tables and drawings. In the following tables and drawings, $f_e$ designates the focal length of the entire eyepiece system, W the apparent visual angle, $f_1$ the focal length of the first lens element, $f_{23}$ the resultant focal length of the second and third lens elements (the cemented lens group), $f_b$ the distance between the image forming plane to be viewed through the eyepiece system and the first surface of the first lens element, $L_D$ the distance between the first surface of the first lens element and the last surface of the third lens element, R the radius of curvature of each lens surface, D the lens thickness or distance between the lenses, N the refractive index for the d-line, and ν the Abbe number. While in the following aberration diagrams, d-line, g-line, C-line, F-line, and e-line represent the chromatic aberration represented by spherical aberration and lateral chromatic aberration, at the respective wavelengths, S represents the Sagittal image, and M represents the Meridional image and $\beta$ represents the apparent visual angle.

In all the embodiments below, the eyepiece system is comprised of a first lens element 21 and a cemented lens group 24 in this order from the object side. The cemented lens group 24 is composed of a negative meniscus lens element 22 and a biconvex lens element 23 in this order from the object side, in the first and third embodiment. In the second embodiment, the cemented lens group 24 is composed of a biconvex lens element 23 and a negative meniscus lens element 22 in this order from the object side.

The shape of a rotation-symmetry aspherical surface can be generally expressed as follows.

$$x = Ch_2/\{1+[1-(1+K)C_2h_2]^{1/2}\} + A4h_4 + A6h_6 + A8h_8 + A10h_{10} +$$

Wherein h represents a height above the axis, x represents a distance from a tangent plane of an aspherical vertex, C represents a curvature of the aspherical vertex (1/r), K represents a conic constant, A4 represents a fourth-order aspherical aberration factor, A6 represents a sixth-order aspherical aberration factor, A8 represents a eighth-order aspherical aberration factor; and A10 represents a tenth-order aspherical aberration factor.

EXAMPLE 1

Figure 2:
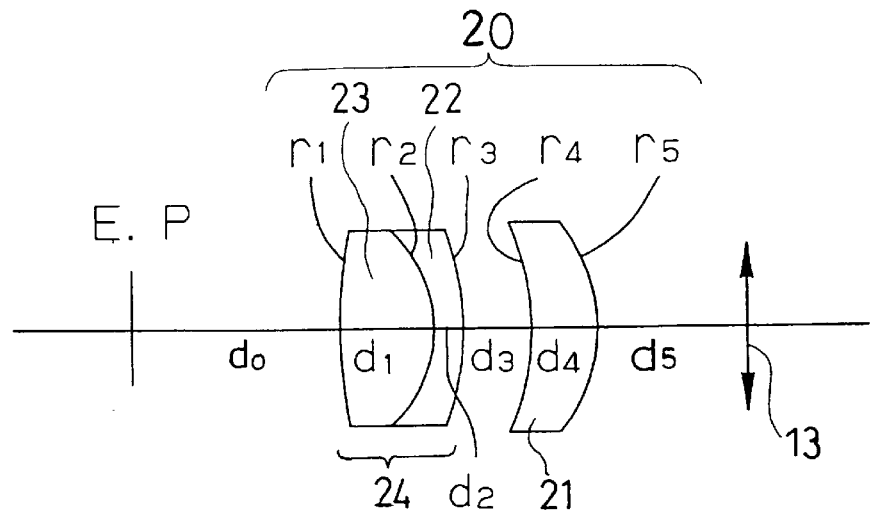
FIG. 2 is a schematic view of a first embodiment of a lens arrangement of an eyepiece system according to the present invention.

FIG. 2 shows a first embodiment of the lens arrangement of an eyepiece system according to the present invention. Table 1 below shows numerical data of the lens system and FIGS. 3A, 3B, 3C and 3D and FIGS. 4A, 4B, 4C, 4D, 4E, 4F, 4G and 4H are diagrams showing the aberrations in the lens system.

TABLE 1

$f_e$ = 22.28 mm
W = 35.6°
$f_1$ = 68.683 mm
$f_{23}$ = 24.918 mm
$f_b$ = 12.550 mm
$L_D$ = 21.840 mm

| surface No. | R | D | N | ν |
|---|---|---|---|---|
| E.P | ∞ | 17.650 | — | — |
| 1 | 44.200 | 8.000 | 1.69680 | 55.5 |
| 2 | −11.258 | 2.500 | 1.76182 | 26.6 |
| 3 | −23.354 | 5.840 | — | — |
| 4* | −21.559 | 5.500 | 1.49176 | 57.4 |
| 5 | −14.266 | 12.550 | — | — |

*designates rotation-symmetrical aspherical surface.
aspherical data

No.4;  K=0.0, A4=−1.354×10⁻⁴, A6=5.074×10⁻⁷, A8=−5.009×10₋₁₉, A10=0.0, A12=0.0

EXAMPLE 2

Figure 5:
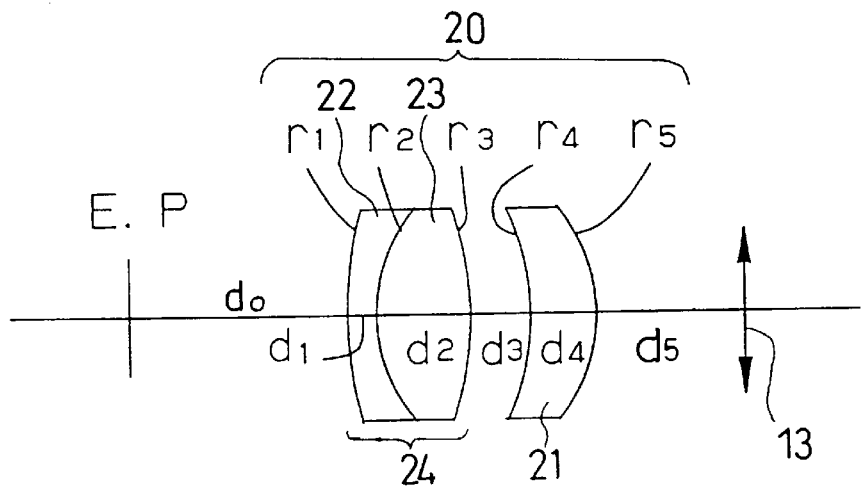
FIG. 5 is a schematic view of a second embodiment of a lens arrangement of an eyepiece system according to the present invention.

FIG. 5 shows a second embodiment of the lens arrangement of an eyepiece system according to the present invention. Table 2 below shows numerical data of the lens system and FIGS. 6A, 6B, 6C and 6D and FIGS. 7A, 7B, 7C, 7D, 7E, 7F, 7G and 7H are diagrams showing the aberrations in the lens system.

TABLE 2

$f_e$ = 22.28 mm
W = 35.7°
$f_1$ = 74.270 mm
$f_{23}$ = 24.416 mm
$f_b$ = 12.460 mm
$L_D$ = 21.130 mm

| surface No. | R | D | N | ν |
|---|---|---|---|---|
| E.P | ∞ | 18.461 | — | — |
| 1 | 33.963 | 2.500 | 1.76182 | 26.6 |

TABLE 2-continued

| | | | | |
|---|---|---|---|---|
| 2 | 13.822 | 8.000 | 1.69680 | 55.5 |
| 3 | −26.684 | 5.130 | — | — |
| 4* | −20.855 | 5.500 | 1.49176 | 57.4 |
| 5 | −14.429 | 12.460 | — | — |

*designates rotation-symmetrical aspherical surface.
aspherical data

No.4; K=0.0, A4=−1.365×$10^{-4}$, A6=5.879×$10^{-7}$, A8=−5.414×$10^{-9}$, A10=0.0, A12=0.0

EXAMPLE 3

Figure 8:
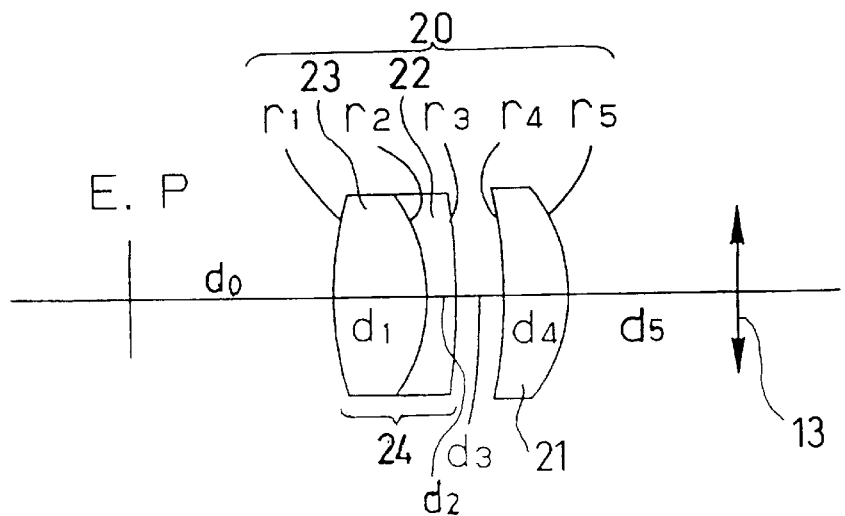
FIG. 8 is a schematic view of a third embodiment of a lens arrangement of an eyepiece system according to the present invention.
Figure 3A:
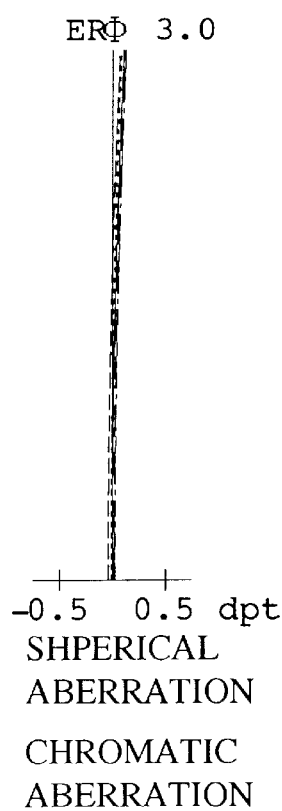
FIGS. 3A, 3B, 3C and 3D show aberration diagrams of the lens system shown in FIG. 2.
Figure 3B:
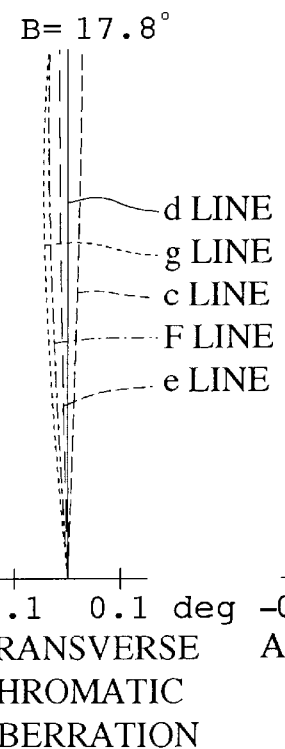
Figure 3C:
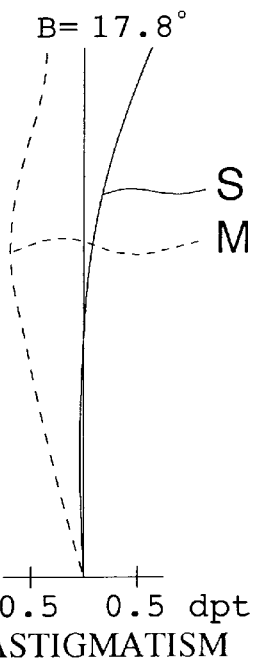
Figure 3D:
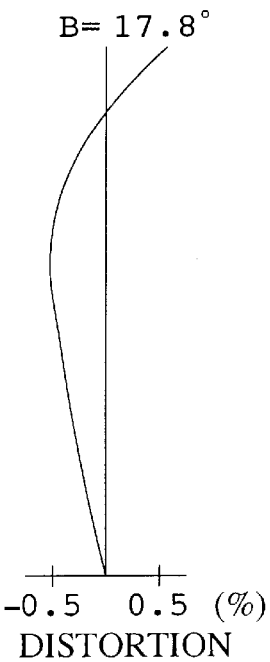
Figure 9A:
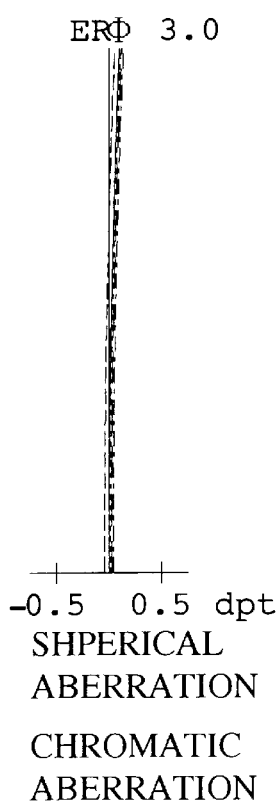
FIGS. 9A, 9B, 9C and 9D show aberration diagrams of the lens system shown in FIG. 8.
Figure 9B:
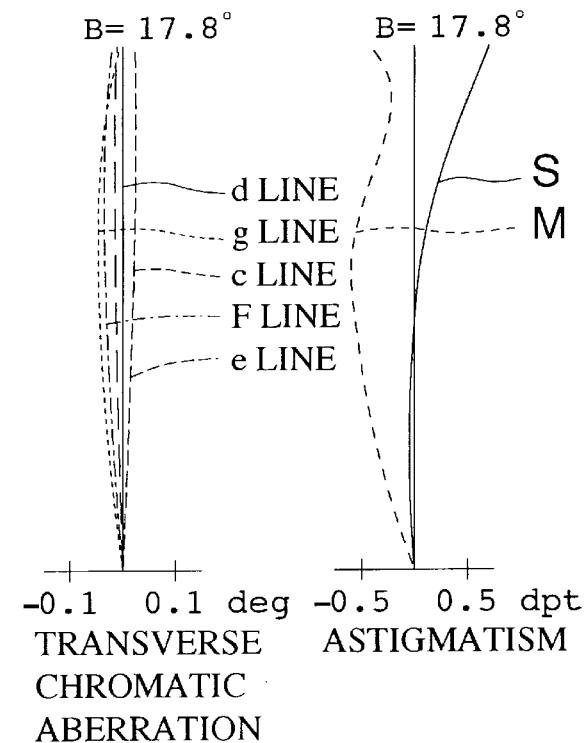
Figure 9C:
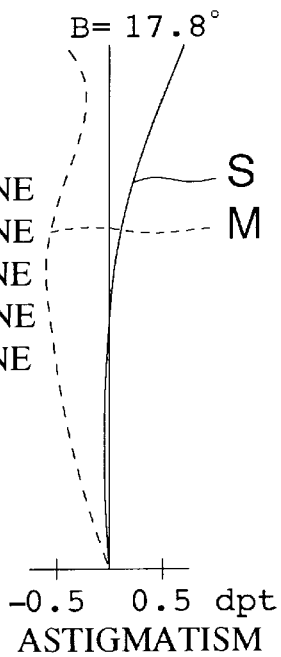
Figure 9D:
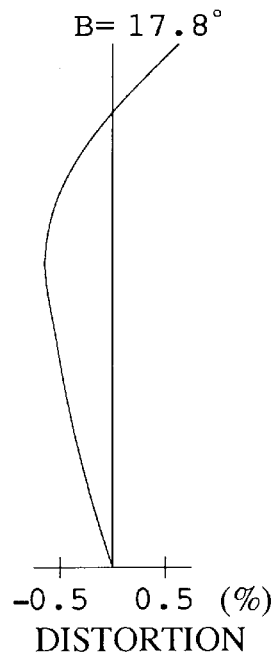

FIG. 8 shows a third embodiment of the lens arrangement of an eyepiece system according to the present invention. Table 3 below shows numerical data of the lens system and FIGS. 9A, 9B, 9C and 9D and FIGS. 10A, 10B, 10C, 10D, 10E, 10F, 10G and 10H are diagrams showing the aberrations in the lens system.

TABLE 3

| $f_e$ = 22.29 mm | | | | |
|---|---|---|---|---|
| W = 35.6° | | | | |
| $f_1$ = 40.005 mm | | | | |
| $f_{23}$ = 33.023 mm | | | | |
| $f_b$ = 14.219 mm | | | | |
| $L_D$ = 20.073 mm | | | | |
| surface No. | R | D | N | ν |
| E.P | ∞ | 17.222 | — | — |
| 1 | 30.036 | 8.000 | 1.69680 | 55.5 |
| 2 | −14.612 | 2.500 | 1.76128 | 26.6 |
| 3 | −59.538 | 4.073 | — | — |
| 4* | −42.264 | 5.500 | 1.49176 | 57.4 |
| 5 | −14.000 | 14.219 | — | — |

*designates rotation-symmetrical aspherical surface.
aspherical data

No.4; K=0.0, A4=−1.326×$10^{-4}$, A6=2.173×$10^{-7}$, A8=−3.027×$10^{-9}$, A10=0.0, A12=0.0

Table 4 below shows numerical values of the conditions (1) through (3) for the three embodiments mentioned above.

TABLE 4

| | embodiment 1 | embodiment 2 | embodiment 3 |
|---|---|---|---|
| formula (1) | 0.32 | 0.30 | 0.56 |
| formula (2) | 0.89 | 0.91 | 0.68 |
| formula (3) | 1.54 | 1.51 | 1.54 |

As can be seen from Table 4, each embodiment satisfies the conditions (1) through (3), and the aberrations are well corrected.

Although the above mentioned embodiments are applied to an optical system having a relay lens (system) provided behind the objective optical system (photographing optical system), the present invention can be applied to an optical system having no relay lens (system).

As may be understood from the above discussion, according to the present invention, an eyepiece system having a short length which is approximately 1.5 times the focal length, in which the distance $f_b$ can be increased to be approximately 0.5 to 0.6 times the focal length can be obtained. Consequently, if the eyepiece system is used for a view finder which is provided therein with an internal indication member in the vicinity of the image forming plane to be viewed, it is possible to provide a space large enough to accommodate the internal indication member without increasing the length of the eyepiece, i.e., without increasing the size of the view finder or reducing the magnification of the finder. Moreover, since the image forming plane is located far from the first surface of the first lens element (since the distance $f_b$ is large), foreign matter stuck to the internal indication member or cracks in the indication member in the vicinity of the image forming plane, does not tend to obstruct the viewer.

What is claimed is:

1. An eyepiece system including a first, a second and a third lens element arranged in this order from the object side, said first lens element being made of a meniscus lens of positive power having a convex surface located on the object side, said second and third lens elements are cemented to form a cemented lens group of positive power, wherein said eyepiece system satisfies the following conditions (1) and (2):

$$0.2 < f_e/f_1 < 0.65 \tag{1}$$

and $$0.6 < f_e/f_{23} < 1.0, \tag{2}$$

wherein $f_1$ is the focal length of said first lens element, $f_e$ is the focal length of the entire said eyepiece system, $f_{23}$ is the resultant focal length of said second and third lens elements.

2. An eyepiece system according to claim 1, wherein said eyepiece system further satisfies the following condition (3):

$$(L_D + f_b)/f_e < 1.6, \tag{3}$$

wherein $L_D$ is the distance between the first surface of said first lens element and the last surface of said third lens element, $f_b$ is the distance between the image forming plane to be viewed through said eyepiece system and the first surface of said first lens element.

3. An eyepiece system according to claim 1, wherein said cemented lens group is made of a negative meniscus lens element and a biconvex lens element cemented thereto.

4. The eyepiece system according to claim 1, wherein a length of said eyepiece system is approximately 1.5 times a focal length of said eyepiece system and wherein a distance between an image forming surface, viewed through said eyepiece system, and a first surface of said first lens element is within the range of approximately 0.5 to 0.6 times the focal length of said eyepiece system.

* * * * *